3,296,268
3-CYANOETHYL-2-OXO-5-PHENYL[1,5-a]
PYRIMIDINES
Viktor Papesch, Morton Grove, Ill., assignor to G. D. Searle & Co., Chicago, Ill., a corporation of Delaware
No Drawing. Filed Oct. 19, 1965, Ser. No. 498,120
3 Claims. (Cl. 260—256.4)

The present invention relates to a group of compounds which are substituted pyrazolo[1,5-a]pyrimidines. These compounds have a phenyl substituent at the 5-position and a methyl group at the 7-position of the ring system; both of these substituents are thus on the pyrimidine ring. The pyrazole ring of this system is also further substituted. It contains at least 1, and possibly 2, cyanoethyl substituent; one of them is at the 3-position of the ring system. The pyrazole ring further contains an oxygen substituent at the 2-position of the ring. This substituent can be either in the keto or the enol form. If it is in the enol form, the hydrogen on the oxygen can be replaced by an alkyl or an alkanoyl group to give enol ethers or enol esters.

The present invention thus relates to compounds of the formula

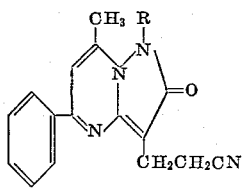

wherein R is a member of the group consisting of hydrogen and cyanoethyl; and to compounds of the formula

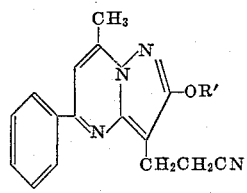

wherein R' is a member of the group consisting of lower alkyl and lower alkanoyl. These lower alkyl radicals contain up to 6 carbon atoms and can be exemplified by methyl, ethyl, and propyl. The lower alkanoyl radicals likewise contain up to 6 carbon atoms and can be exemplified by acetyl and propionyl.

The compounds of this invention are useful because of their pharmacological properties. In particular, they possess anti-inflammatory activity which is demonstrated by a phenylbutazone-like effect on edematous conditions. The present compounds also show activity as pepsin inhibitors.

The compounds of this invention are conveniently prepared by cyanoethylation of the appropriate 5-phenyl-7-methylpyrazolo[1,5-a]pyrimidine having a hydroxy, alkoxy, or acyloxy group at the 2-position. The reaction is ordinarily carried out with acrylonitrile in a pyridine-water solution. Those compounds in which R' is alkyl or alkanoyl are prepared from the corresponding hydroxy compound by reaction with the appropriate alkylating or acylating agent. Thus, reaction of the alcohol with methyl sulfate gives the methyl ether, while the reaction of the alcohol with the appropriate acid anhydride or acid chloride gives the corresponding ester.

The following examples are presented to further illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

Example 1

A mixture of 10 parts of 2-hydroxy-7-methyl-5-phenyl-pyrazolo[1,5-a]pyrimidine, 120 parts by volume of a 50% by volume pyridine water mixture, and 16 parts of acrylonitrile is refluxed for 5 hours. The mixture is then cooled and filtered and the solid separated is washed with water and dried before it is recrystallized from 100 parts by volume of 30% dimethylformamide in ethyl acetate to give 3 - (2 - cyanoethyl) - 7 -methyl - 5- phenyl - 2 - oxo-1,2-dihydropyrazolo[1,5-a]pyrimidine melting at about 283–285° C. This compound has the following formula

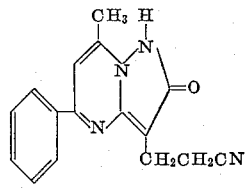

Example 2

A mixture of 30 parts of 2-hydroxy-7-methyl-5-phenyl-pyrazolo[1,5-a]pyrimidine, 48 parts of acrylonitrile, and 360 parts by volume of a 50% by volume pyridine water solution is refluxed for 5 hours and then cooled and filtered. The solvent is evaporated from the filtrate under reduced pressure; alcohol is added to the residue and the mixture is then evaporated to dryness and this process is repeated. The resultant residue is heated with 810 parts of ethyl acetate and the ethyl acetate solution is cooled to room temperature and filtered. The resultant filtrate is then cooled in an ice bath and the precipitate which forms is separated by filtration and then redissolved in ethyl acetate. This ethyl acetate solution is then chromatographed on a silica gel column. The column is eluted with increasing quantities of methanol in ethyl acetate. The fraction obtained by elution with 10% methanol in ethyl acetate is evaporated to dryness and then recrystallized from 20% methanol in ethyl acetate. The product thus obtained is 1,3-bis(2-cyanoethyl)-7-methyl-5-phenyl-2-oxo-1,2-dihydropyrazolo[1,5-a]pyrimidine hemihydrate melting at about 226–227° C.

Example 3

To a suspension of 5.8 parts of 3-(2-cyanoethyl)-7-methyl - 5 - phenyl - 2 - oxo - 1,2 - dihydropyrazolo-[1,5-a]pyrimidine in 145 parts of water is added 58 parts by volume of 10% sodium hydroxide solution. 14.5 parts of methyl sulfate is then added portionwise while the temperature is maintained below 50° C., and the mixture is stirred for 1 hour after the addition is complete. The reaction mixture is then cooled and filtered to collect the precipitated solid. This is recrystallized twice from aqueous ethanol to give 2-methoxy-3-(2-cyanoethyl)-7-methyl-5-phenylpyrazolo[1,5-a]pyrimidine melting at about 152–154° C. This compound has the following formula

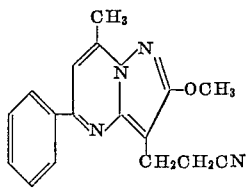

Example 4

A mixture of 4 parts of 3-(2-cyanoethyl)-7-methyl-5-phenyl-2-oxo-1,2-dihydropyrazolo[1,5-a]pyrimidine and 55 parts of acetic anhydride is refluxed for 5 minutes. The resultant mixture is then stirred with 50 parts of water and heated to 75° C. The temperature continues to rise after external heating is discontinued but it stops at about 100° C. The mixture is then allowed to cool and the crystals which form are separated by filtration and washed with absolute ether. The product thus obtained is 2-acetoxy-3-(2-cyanoethyl)-7-methyl-5-phenylpyrazolo[1,5-a]pyrimidine melting at about 136–137° C. This compound has the following formula

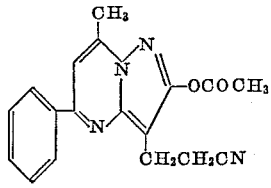

What is claimed is:
1. A compound selected from the group consisting of compounds of the formula

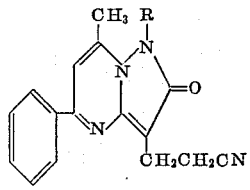

wherein R is selected from the group consisting of hydrogen and cyanoethyl; and compounds of the formula

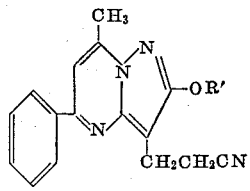

wherein R' is selected from the group consisting of lower alkyl and lower alkanoyl.

2. 2 - methoxy - 3 - (2 - cyanoethyl) - 7 - methyl - 5-phenylpyrazolo[1,5-a]pyrimidine.

3. 1,3 - bis(2 - cyanoethyl) - 7 - methyl - 5 - phenyl - 2-oxo-1,2-dihydropyrazolo[1,5-a]pyrimidine.

No references cited.

ALEX MAZEL, *Primary Examiner.*

M. O'BRIEN, *Assistant Examiner.*